United States Patent [19]

Braun et al.

[11] Patent Number: 5,580,135
[45] Date of Patent: Dec. 3, 1996

[54] DRIVE CHAIN FOR LONG-WALL MINING MACHINE

[75] Inventors: Ernst Braun; Gert Braun, both of Essen, Germany

[73] Assignee: DBT Deutsche Bergbau-Technik GmbH, Wuppertal, Germany

[21] Appl. No.: 400,085

[22] Filed: Mar. 7, 1995

[30] Foreign Application Priority Data

Mar. 10, 1994 [DE] Germany ........................ 44 08 046.8

[51] Int. Cl.⁶ .......................... E21C 35/20; B65G 23/06
[52] U.S. Cl. .......................... 299/43; 299/84.1; 198/834; 198/846
[58] Field of Search .......................... 299/43, 84.1, 67; 198/846, 847, 849, 834

[56] References Cited

U.S. PATENT DOCUMENTS

| | | | |
|---|---|---|---|
| 1,724,150 | 8/1929 | Webb | 198/834 |
| 3,314,526 | 4/1967 | Franek et al. | 198/834 |
| 3,724,901 | 4/1973 | Rollins | 299/84.1 |
| 4,171,824 | 10/1979 | Foster | 280/294 |
| 4,282,971 | 8/1981 | Becker | 198/846 |
| 4,433,777 | 2/1984 | Densmore | 198/834 |
| 4,669,560 | 6/1987 | Wilcox, Jr. et al. | 180/9.1 |

*Primary Examiner*—Frank Tsay
*Attorney, Agent, or Firm*—Herbert Dubno; Andrew Wilford

[57] ABSTRACT

A horizontally extending guide rail has an upwardly open slot and a mining machine is displaceable longitudinally along the guide rail and has a drive wheel with teeth engageable into the slot. A drive chain rides in the slot and has horizontal links and vertical links alternating with the horizontal links and each formed with a horizontal lower shank having ends, a horizontal upper shank having ends above the ends of the respective lower shank and forming an upwardly open pocket dimensioned to receive a tooth of the drive wheel, and a pair of horizontally spaced and vertically extending bights connecting the ends of the upper shank to the ends of the respective lower shank. The bights pass through the horizontal links flanking the respective vertical link.

9 Claims, 3 Drawing Sheets

DRIVE CHAIN FOR LONG-WALL MINING MACHINE

FIELD OF THE INVENTION

The present invention relates to a chain. More particularly this invention concerns a drive chain for a long-wall mining machine, for instance a coal plow.

BACKGROUND OF THE INVENTION

A standard long-wall mining machine such as described in my copending application attorney's 19560 has a scraper conveyor that extends horizontally parallel to the face being worked. A guide beam is fixed to the face side of the conveyor and is formed with an upwardly open slot in which is seated a longitudinally shiftable drive chain. A coal plow or the like rides on the rail and has a drive sprocket meshing with the chain. This plow scrapes ore or coal from the face and deposits it in the conveyor.

The standard chain is a simple round-link chain that rides in a cruciform-section upwardly open slot in the guide rail. The teeth of the drive wheel of the mining machine engage in the horizontal chain links, which are held in confronting horizontally open grooves of the guide rail. These teeth must therefore be relatively large and relatively widely spaced, even when as is common the horizontal links are long and the vertical ones short.

OBJECTS OF THE INVENTION

It is therefore an object of the present invention to provide an improved drive chain for a mining machine.

Another object is the provision of such an improved drive chain for a mining machine which overcomes the above-given disadvantages, that is which allows a smaller-diameter drive wheel to be used while still ensuring good force transmission between the chain and the drive wheel.

SUMMARY OF THE INVENTION

The instant invention is a chain used in combination with a horizontally extending guide rail having an upwardly open slot and a mining machine displaceable longitudinally along the guide rail and having a drive wheel with teeth engageable into the slot. The chain rides in the slot and has according to the invention horizontal links and vertical links alternating with the horizontal links and each formed with a horizontal lower shank having ends, a horizontal upper shank having ends above the ends of the respective lower shank and forming an upwardly open pocket dimensioned to receive a tooth of the drive wheel, and a pair of horizontally spaced and vertically extending bights connecting the ends of the upper shank to the ends of the respective lower shank. The bights pass through the horizontal links flanking the respective vertical link.

Thus with this system the teeth of the wheel engage in both the vertical and horizontal chain links, so that the pitch of the wheels's teeth can be fairly small. Not only does this means that force transmission will be very good, but a much smaller-diameter wheel can be used with no loss in efficiency. In a machine used below ground where space is always at a premium, such a size reduction is a substantial advantage.

According to another feature of the invention each upper shank has a pair of horizontally spaced and substantially parallel side parts laterally flanking and defining the pocket and having ends connected to the respective bights. In turn each side part has a downwardly projecting cheek plate having a lower edge spaced from the respective lower shank. The lower shank can be a standard solid bar as is standard. The space between the lower edge of each cheek plate and the respective lower shank allows coal particles or the like to escape from the respective pocket.

Each vertical link has a predetermined overall height and each cheek plate has a vertical dimension equal to more than half the height. Thus these cheek plates maintain the link spacing in the chain, preventing any possibility of it kinking outside the guide-rail groove. Furthermore each cheek plate is of inverted L-section and has an upper laterally outwardly projecting ridge of trapezoidal section. Such construction makes the link very rugged and capable of transmitting considerable force.

The bights according to the invention have upper ends forming rounded corners and these bights have longitudinally oppositely directed and substantially planar outer faces.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
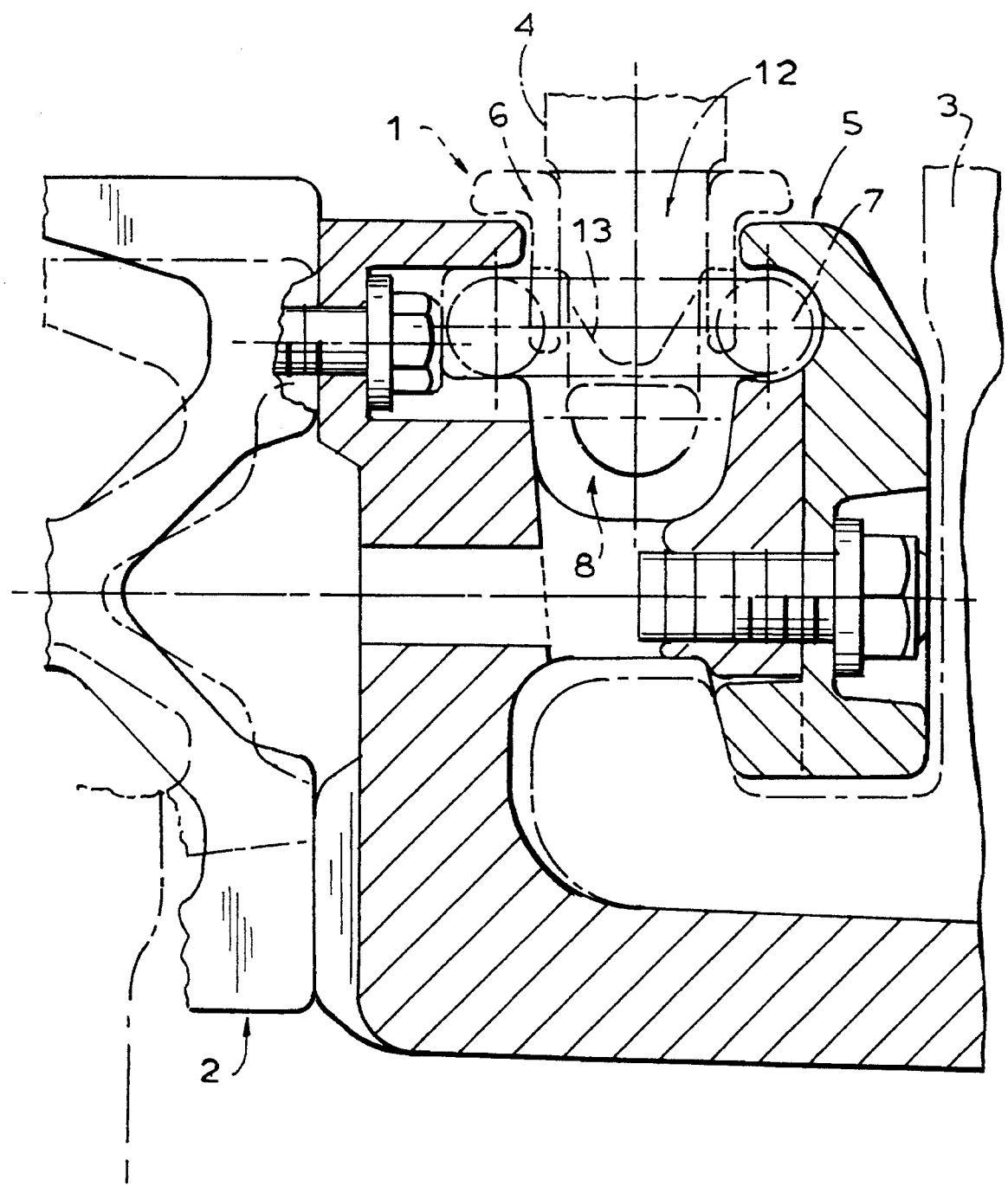
FIG. 1 is a vertical section through a mining apparatus having a chain according to the invention.

As seen in FIG. 1 a chain 1 runs in an upwardly open slot 6 of a guide rail 5 secured to the face side of a conveyor 2 and a mining machine 3 can ride along the rail 5 with a toothed wheel 4 of the machine 3 engaging in the chain 1 as generally described in my above-mentioned patent application. The chain 1 has round-type horizontal links 7 of standard construction and vertical links 8 each constituted by an upper shank 9, a lower shank 10, and two end bights 11 joining the respective shanks 9 and 10.

Figure 2:
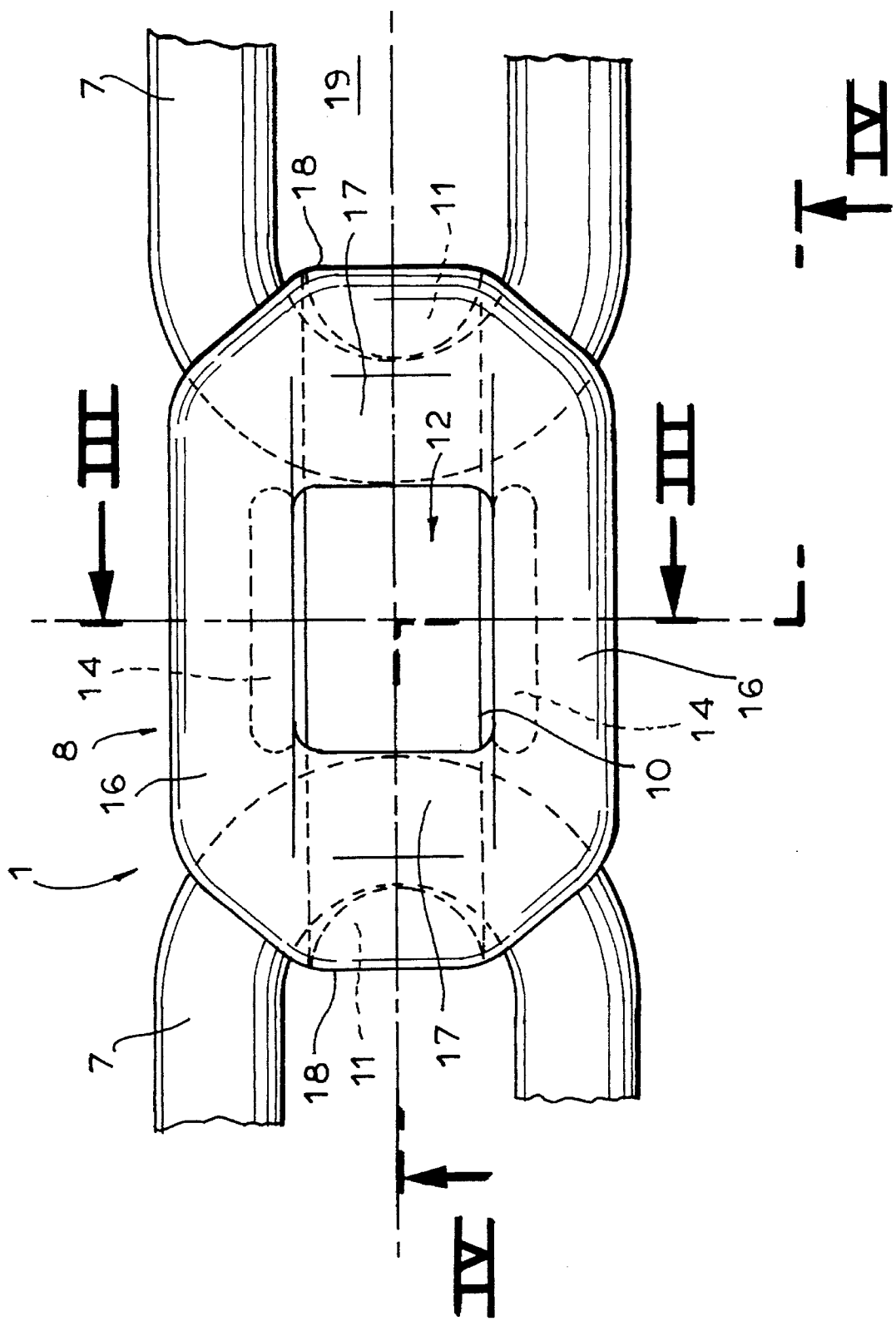
FIG. 2 is a top view of a portion of the chain.
Figure 3:
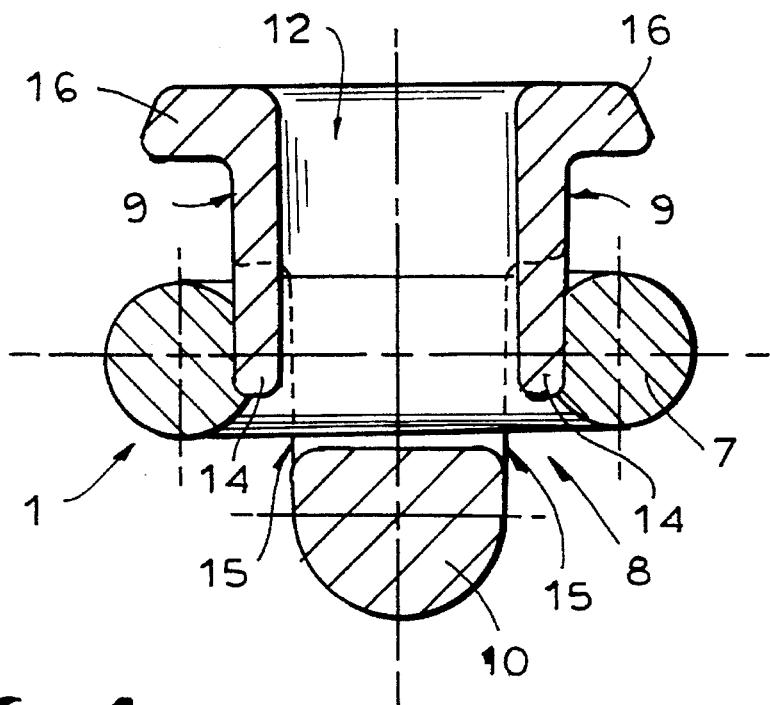
FIG. 3 is a section taken along line III—III of FIG. 2.
Figure 4:
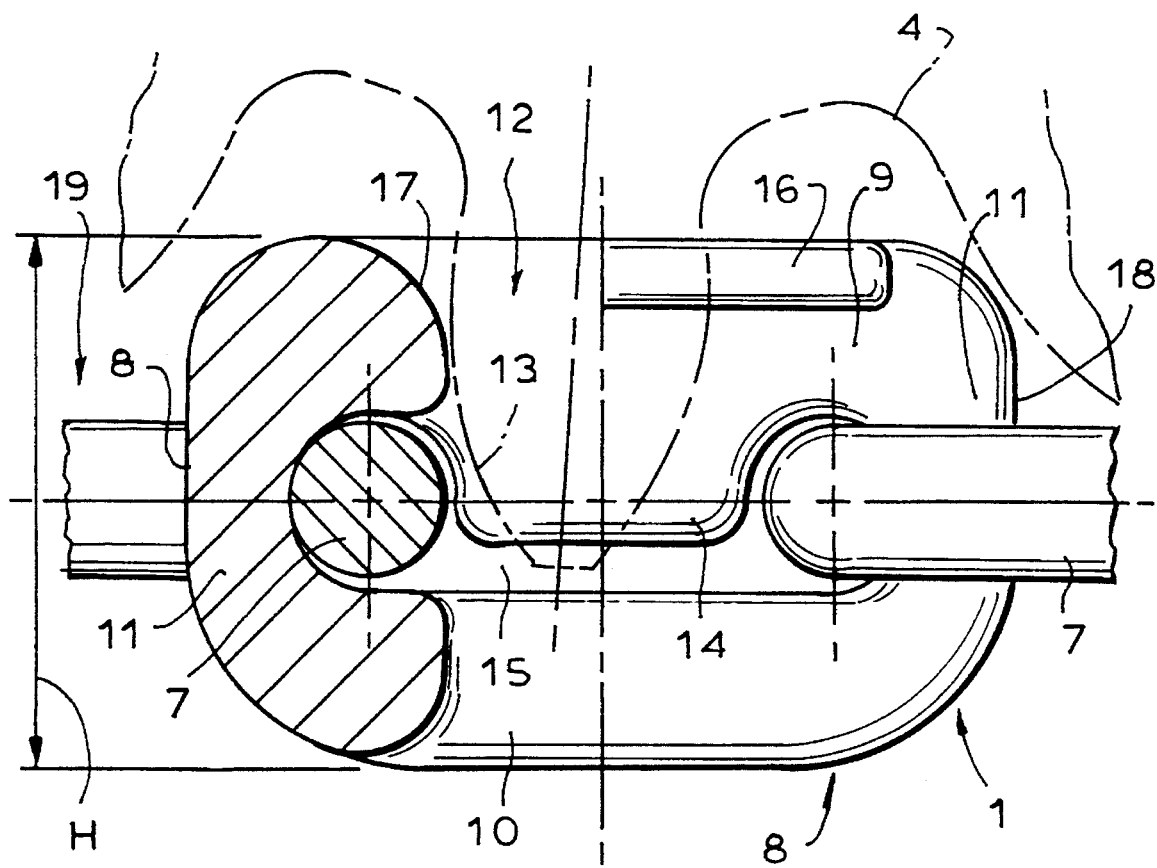
FIG. 4 is a section taken along line IV—IV of FIG. 2.

According to the invention each upper shank 9 forms as shown in FIGS. 2 through 4 an upwardly open pocket 12 adapted to receive teeth 13 of the wheel 4, while the adjacent teeth engage through the flanking horizontal links 7. Each upper shank 9 is in fact formed by two parallel side parts formed with downwardly projecting cheek plates 14 that have planar and parallel inner faces and that have an overall height equal to somewhat more than half the overall height H of the link 8. The lower edge of each cheek plate 14 forms with the flat upper surface of the respective lower shank 10 a marrow gap 15 that allows coal dust or the like to pass so that the pocket 12 will not fill. In addition each upper-shank side part 9 is of inverted L-shape, having an upper trapezoidal-section and outwardly projecting ridge 16 that imparts considerable rigidity and wear resistance to the chain 1.

Each bight 11 is rounded at 17 at its inner upper edge so that the teeth 13 can enter and exit the pockets 12 easily. Furthermore the outer end faces 18 of the bights 11 are planar and parallel so that they define in the flanking horizontal links 7 further pockets 19 for receiving the teeth 13. Thus the bulk of the wear will be on the relatively massive bights 11, both for the teeth 13 engaged in the pockets 12 and for the teeth 13 in the pockets 19.

We claim:

1. In combination with a horizontally extending guide rail having an upwardly open slot and a mining machine displaceable longitudinally along the guide rail and having a drive wheel with teeth engageable into the slot, a drive chain in the slot and comprising:

horizontal links and vertical links alternating with the horizontal links and each formed with a horizontal lower shank having ends, a horizontal upper shank having ends above the ends of the respective lower shank and forming an upwardly open pocket dimensioned to receive a tooth of the drive wheel, and a pair of horizontally spaced and vertically extending bights connecting the ends of the upper shank to the ends of the respective lower shank, the bights passing through the horizontal links flanking the respective vertical link.

2. The drive chain defined in claim 1 wherein each upper shank has a pair of horizontally spaced and substantially parallel side parts laterally flanking and defining the pocket and having ends connected to the respective bights.

3. The drive chain defined in claim 2 wherein each side part has a downwardly projecting cheek plate having a lower edge spaced from the respective lower shank.

4. The drive chain defined in claim 3 wherein each vertical link has a predetermined overall height and each cheek plate has a vertical dimension equal to more than half the height.

5. The drive chain defined in claim 3 wherein each cheek plate is of inverted L-section and has an upper laterally outwardly projecting ridge of trapezoidal section.

6. The drive chain defined in claim 2 wherein the bights having upper ends forming rounded corners.

7. The drive chain defined in claim 1 wherein the bights have longitudinally oppositely directed and substantially planar outer faces.

8. The drive chain defined in claim 1 wherein each horizontal link also forms an upwardly open tooth-receiving pocket and the angular spacing between adjacent teeth on the wheel is generally equal to the longitudinal spacing between adjacent pockets of the chain.

9. In combination with a horizontally extending guide rail having an upwardly open slot and a mining machine displaceable longitudinally along the guide rail and having a drive wheel with teeth engageable into the slot, a drive chain in the slot and comprising:

horizontal links and vertical links alternating with the horizontal links and each formed with a horizontal lower shank having ends, a horizontal upper shank having ends above the ends of the respective lower shank and having a pair of horizontally extending and parallel side parts forming an upwardly open pocket dimensioned to receive a tooth of the drive wheel and each formed with a downwardly projecting cheek plate, and a pair of horizontally spaced and vertically extending bights connecting the ends of the upper shank to the ends of the respective lower shank, the bights passing through the horizontal links flanking the respective vertical link.

* * * * *